United States Patent [19]

Schulz et al.

[11] Patent Number: 4,898,426
[45] Date of Patent: Feb. 6, 1990

[54] PASSENGER SEAT FOR AN AIRPLANE

[75] Inventors: Thilo Schulz; Karl-Heinz Schmitz; Thomas Schneider, all of Herborn, Fed. Rep. of Germany

[73] Assignee: Buderus-Sell GmbH, Herborn, Fed. Rep. of Germany

[21] Appl. No.: 321,991

[22] Filed: Mar. 10, 1989

[30] Foreign Application Priority Data

Apr. 11, 1988 [DE] Fed. Rep. of Germany ....... 3811939

[51] Int. Cl.$^4$ .............................................. A47C 7/02
[52] U.S. Cl. ..................... 297/452; 156/213; 108/901; 297/232; 297/445
[58] Field of Search ............... 297/232, 248, 452, 445, 297/450, 216; 156/213; 428/117; 108/901

[56] References Cited

U.S. PATENT DOCUMENTS

| 3,091,497 | 5/1963 | Houser | 297/452 X |
| 3,468,582 | 9/1969 | Judd | 297/248 X |
| 3,929,536 | 12/1975 | Maughan | 156/213 |
| 4,296,967 | 10/1981 | Vogel | 297/452 X |
| 4,526,421 | 7/1985 | Brennan et al. | 297/232 |

FOREIGN PATENT DOCUMENTS 2831891 1/1980 Fed. Rep. of Germany ...... 297/452

Primary Examiner—James T. McCall
Attorney, Agent, or Firm—Herbert Dubno

[57] ABSTRACT

To make the passenger seat for the airplane as light as possible while satisfying safety requirements, some or all the essential components are made with a sandwich-like structure, especially from sandwich panels. These sandwich panels can be made from a plurality of covering layers with a light but strong supporting core (e.g. with a honeycomb structure) interposed between pairs of covering layers.

6 Claims, 6 Drawing Sheets

PASSENGER SEAT FOR AN AIRPLANE

FIELD OF THE INVENTION

Our present invention relates to a passenger seat for an airplane.

BACKGROUND OF THE INVENTION

A passenger seat for an airplane generally comprises a seat shell with lateral supporting pieces and armrests mounted on a seat pedestal and an adjustable backrest with a flip-down flap-type table.

All the usual good characteristics for a seat such as anatomically satisfactory seating and aesthetic properties should be available in a satisfactory airplane passenger seat. Furthermore the airplane passenger seat has special safety standards and a weight-saving structure.

Of course every saving in weight contributes to lowering operating costs for the airplane.

Because of the high safety standards the supporting members of the airplane passenger seat have hitherto been made from deep-drawn metal pieces and metal components provided with reinforcing webs or other members (German Open Application Pat. No. 1 900 070) or milled and/or molded or cast aluminum parts (French Open Application Pat. No. 75 35 215). Supporting frames made from tubular elements for an airplane passenger seat are described in British Pat. No. 2 022 403.

OBJECT OF THE INVENTION

It is an object of our invention to provide an improved airplane passenger seat of satisfactory strength and which has the minimum weight while being economical and safe.

SUMMARY OF THE INVENTION

These objects and others which will become more readily apparent hereinafter are attained in accordance with our invention in a passenger seat for an airplane comprising a seat shell with lateral supporting pieces and armrests mounted on a seat pedestal and an adjustable backrest with a flip-down flap-type table.

According to our invention, one or more of the components such as the seat shell and/or the lateral supporting pieces with the armrests, the a seat pedestal and the backrest with the flip-down flap-type table are made from a plurality of sandwich plates, panels or members.

A sandwich panel as here defined is a structural member in which an openwork core is flanked by a pair of cover skins bonded to the openwork or cell-like core which can be a honeycomb.

The structural components, which use sandwich panels as starting material, can be made economically in a series of manufacturing process steps which contrast with the conventional forming of the earlier structure. By optimization of the covering layer strength of the sandwich panels the weight of the seat can be reduced markedly without reducing the seating comfort.

The sandwich panels may be made from a plurality of covering layers with a supporting core interposed between the individual covering layers. At least one component may be composed entirely or partially from a plurality of sandwich panels connected with each other. A central covering layer can serve two or more cores or to combine the individual sandwich panels.

The sandwich panels may also be assembled from a plurality of supporting cores and/or covering layers of different thicknesses. The seat shell, for example, can comprise at least two sandwich panels glued together. The supporting pieces may be assembled from a plurality of sandwich panels glued together whose front sides are covered by glued-on sections. The central sandwich panel has a thickness corresponding to the width of the armrest. The a seat pedestal and/or the flip-down flap-type table may be made from a plane parallel sandwich panel in which both covering layers are combined in a cut region by means of a glued-on section.

The seat foot may be so formed and dimensioned in a loaded and/or stressed region that the seat foot experiences a deformation under extreme load and because of that consumes energy. The backrest can be assembled from two thin spherically formed base members which surround a supporting core. The backrest can have lateral reinforcing protrusions made from prefinished sandwich panels. The covering layers of the lateral reinforcing protrusions can be fit or adjusted to the transverse forces acting across the thickness thereof.

The manufacturing process for making components of an airplane passenger seat can include steps in which a plurality of essential parts of the components are cut from a large plane parallel sandwich panel. This sandwich panel can be made by wrapping a resin impregnated covering around a supporting core which is light but strong, and hardening the composite which is thus formed.

The desired curvature of a sandwich panel for one of the components can be attained by hardening at least one covering layer in a suitable mold. The desired curvature of a sandwich panel for the components is made by slotting or slitting a covering layer of the sandwich panel and by gluing on at least one premolded former in a mold or by hardening in a mold with an unhardened covering layer.

The connection between a plurality of supporting cores and covering layers of a sandwich panel for the components can be made by hardening in a mold during the manufacturing process. At least one base member and/or covering layer surrounding a supporting core of a sandwich panel of the components can be made individually and subsequently is glued to the supporting core.

Especially for fabrication of the backrest, the core can be contoured and the cover skins applied thereto and correspondingly given the contour of the core in a mold in which the hardenable synthetic resin of the skins is caused to set. One skin can be applied in this manner to the core while the open side of the core is milled to impart a selected contour thereto. Then the other skin is applied and solidified in a mold.

BRIEF DESCRIPTION OF THE DRAWING

The above and other objects, features and advantages of our invention will become more readily apparent from the following description, reference being made to the accompanying highly diagrammatic in which:

FIG. 1a a detail view showing principles of the structural members of the seat;

SPECIFIC DESCRIPTION

Figure 1:
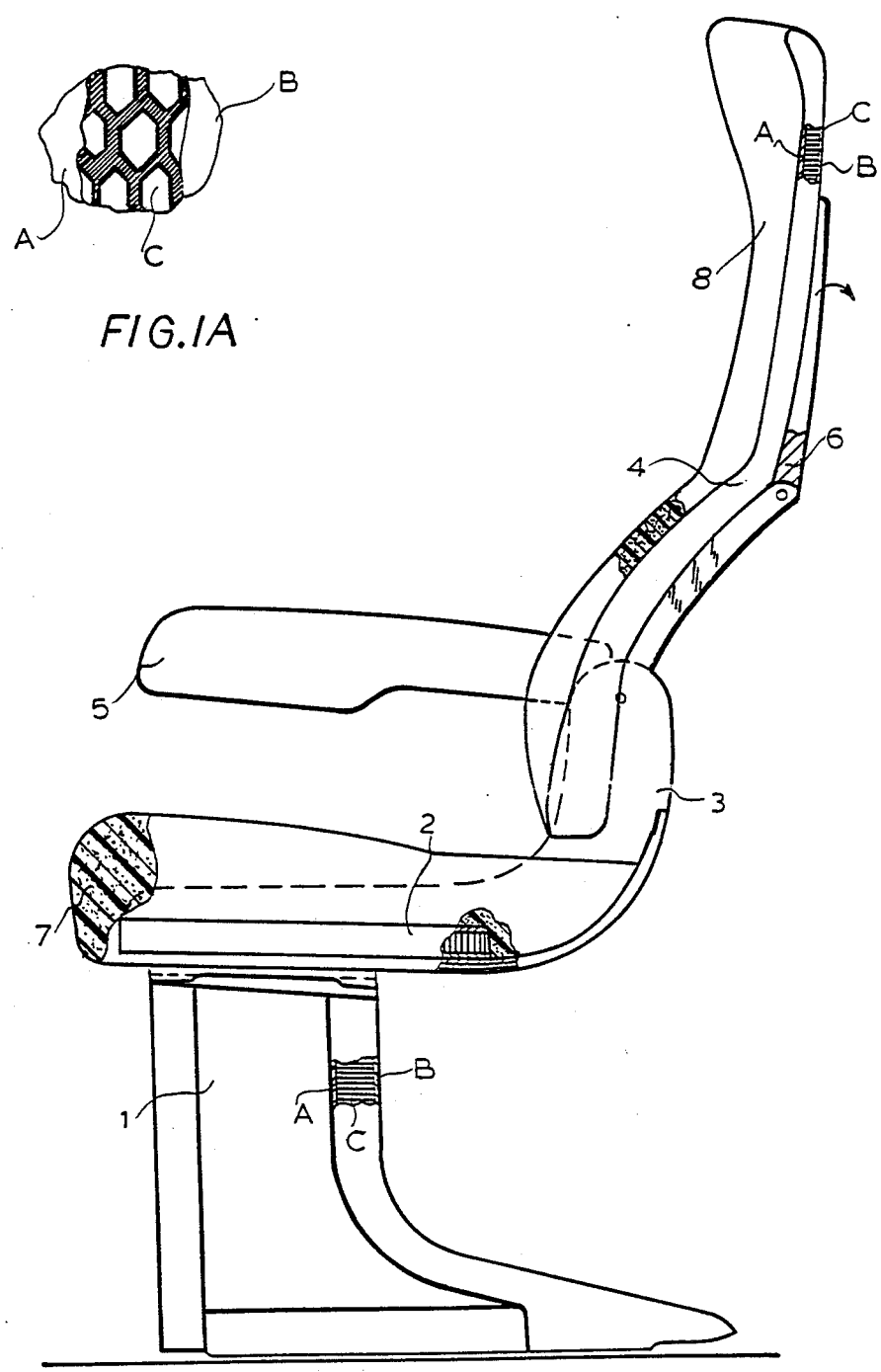
FIG. 1 is a side cross sectional view of a complete airplane passenger seat according to our invention.

The passenger seat of the airplane comprises the a seat pedestal 1 anchored to the floor or deck of the plane, the seat shell 2 mounted on a seat pedestal 1 with the lateral supporting pieces 3 and the backrest 4. Furthermore the important parts for operation of the airplane passenger seat are the armrests 5 and the flip-down flap-type table 6 mounted behind the armrests 4.

The structural parts which make up the seat which are crucial for the weight of the seat on account of their spatial dimensions are the a seat pedestal, the seat shell, the lateral supporting pieces, the backrest and the flip-down flap-type table. The seat shell and the armrests substantially determine the seat comfort. That is also related to the changes between different seat positions.

In FIG. 1 the seat cushion 7 and the back cushion 8 which are easily replaced are also shown as well as the components constructed from the sandwich panels. As is generically indicated by FIG. 1a and, of course, in FIG. 1, the pedestal 1, the seat shell 2, table 6 itself are composed of at least one sandwich structure having a honeycomb core flanked by sking A and B bonded to the honeycomb.

Figure 2:
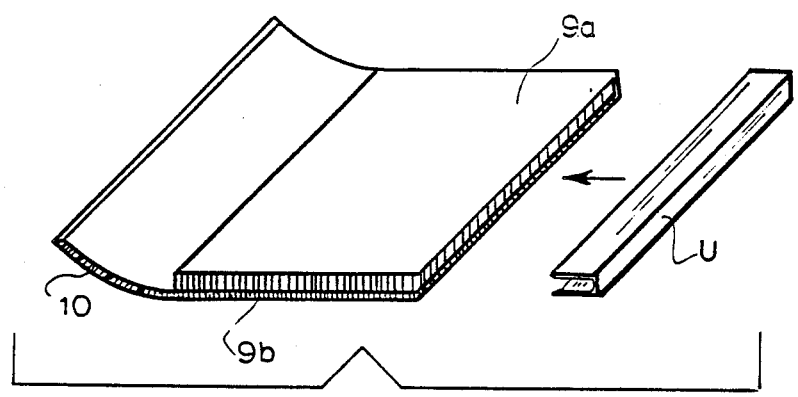
FIG. 2 is an exploded perspective view showing a portion of a base member of the seat shell.

The basic structure of the seat supporting member 2 is illustrated in FIG. 2.

One upper thicker sandwich panel 9a is combined with a lower thinner sandwich panel 9b. The extended portion 10 of the sandwich panel 9b extended to the rear beyond the sandwich panel 9a is curved. The extended portion 10 can be curved when the not yet hardened sandwich panel 9b, at least one of its covering layers saturated with a hardenable synthetic resin, e.g. a thermosetting resin, is hardened into a shape corresponding to the desired curvature in a suitable mold.

Figure 3:
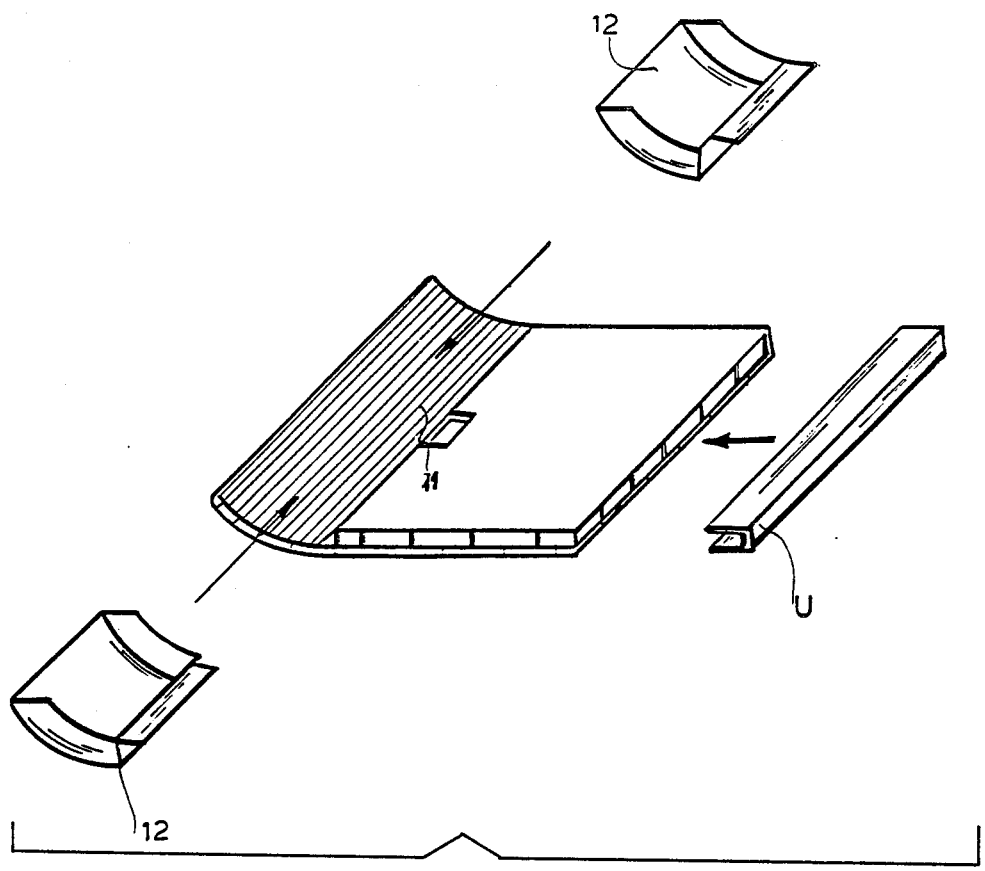
FIG. 3 is an exploded perspective view showing the seat shell constructed from sandwich panels and molded pieces.

It is also possible to slit the hardened covering layer of the thinner sandwich panel on the concave side so that the plurality of parallel longitudinal slits 11 allow the sandwich panel 9b to be curved in the desired way. On the curved arc-shaped portion molded pieces 12 are subsequently glued on so that the desired stable shape is attained. FIG. 3 shows the structure with a slotted covering layer and the molded pieces 12 which are to be glued on.

Along the edges f the seat shell, an edging channel U can be cemented

Figure 4:
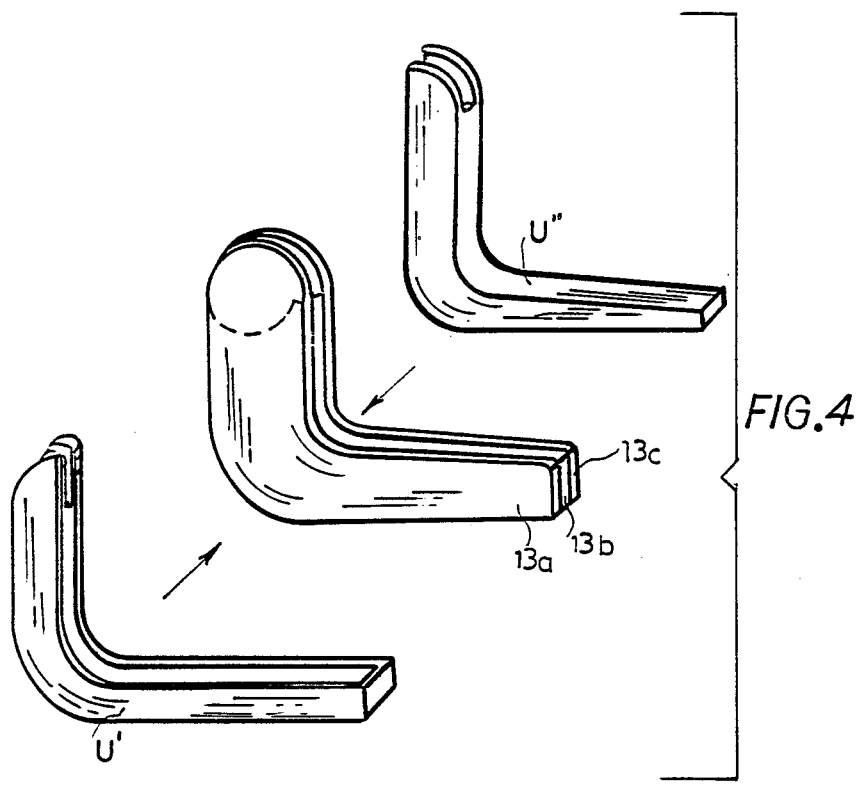
FIG. 4 is a perspective exploded view showing the assembly of a supporting member.
Figure 4A:
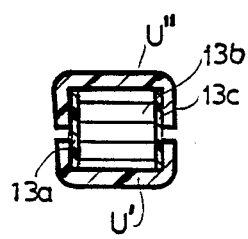
FIG. 4a section through the assembled support member.
Figure 5:
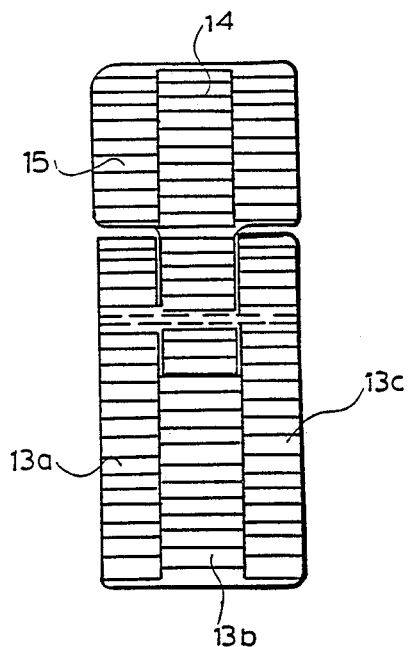
FIG. 5 is a diagram showing formation of an armrest.
Figure 6:
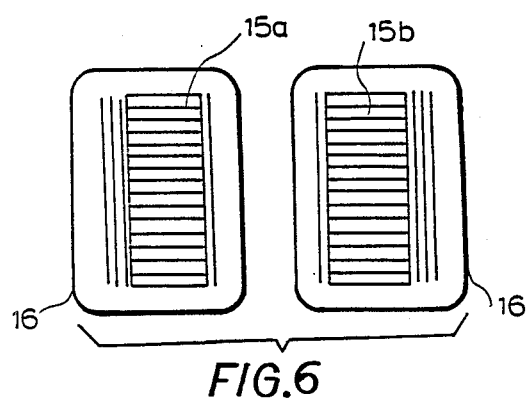
FIG. 6 is a diagram detailing the armrest structure according to our invention.

The supporting pieces 3 mounted laterally on the seat shell 2 and their structure are illustrated in FIG. 4. Three molded pieces 13a, 13b and 13c, preformed from sandwich panels, are cemented together. The inner molded piece 13b is shortened at the head portion and has a thickness so that the mounting portion of the armrest are fit between both head portions of the outer molded pieces 13a and 13c. The glued-on covers U' and U" which cover the cut surfaces are indicated schematically (see also FIG. 5). The mounting portion of the pivotable armrest 5 are indicated at 14 in FIG. 5. The structure of the armrests 5 is illustrated in FIG. 6. A preimpregnated foil 16, e.g. of fiberglass soaked in the hardenable resin, e.g. an epoxy is wrapped around both supporting cores 15a and 15b (e.g. synthetic resin or aluminum honeycomb) in the indicated way. The unit so provided is hardened then in a mold in a conventional way.

Figures 7A, 7B:
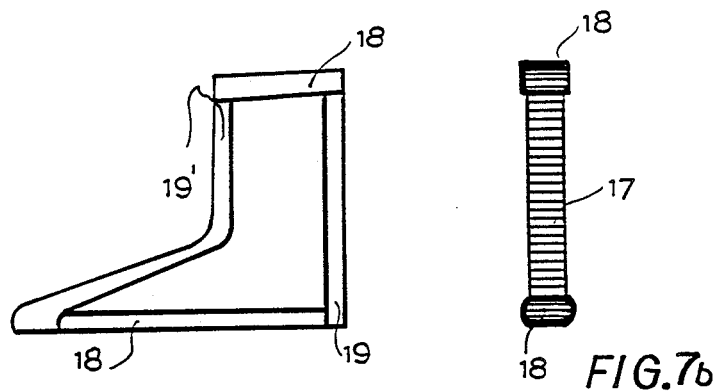
FIGS. 7a and 7b are side elevational and front elevational views of the a seat pedestal for the passenger seat according to our invention.

The methods of construction of the armrest and the supporting pieces are interchangable. A seat foot on which the seat shell is mounted is indicated in FIGS. 7a and 7b. A blank corresponding to the desired shape made from a plane parallel sandwich panel 17 is covered at its cut locations with glued-on sections 18, as can be seen from FIG. 7b. The pedestal is so formed and dimensioned in its front portion 19 (broken zone) or its stretched zone 19' so that on extreme loading of the seat in this region a destructive deformation occurs.

Figure 8A:
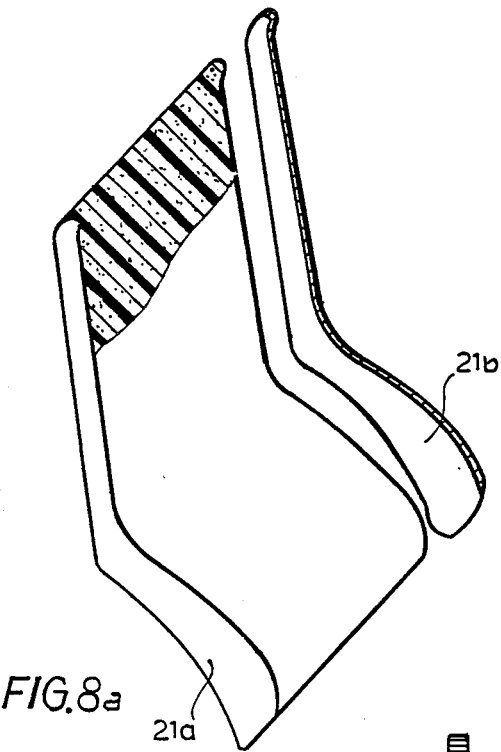
FIGS. 8a, 8b and 8c are perspective, plan and sectional views of the armrest used in the passenger seat according to our invention.
Figure 8B:
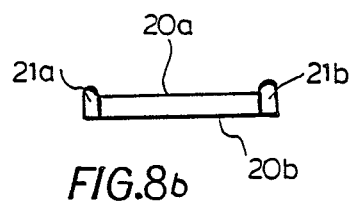

The backrest (FIGS. 8a and 8b) is the largest component. Different processes are suitable for its manufacture. It is assembled from two thin molded shells 20a, 20b, which surround a supporting core. A covering layer soaked with resin and a supporting core made of contoured foam can be deposited in a mold and then hardened to form the backrest.

Figure 8C:
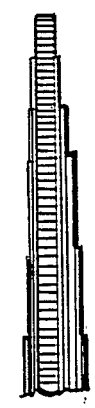

It is also possible to provide a covering layer with the desired form by hardening in a mold, to mill or cutaway the rear supporting core on its opposing side to the desired surface shape and subsequently to apply and harden the outer covering layer. The covering layers 20a and 20b include the reinforcing protrusions 21a and 21b. In FIG. 8c it is indicated that the thickness of the reinforcing protrusions 21a and 21b is adjusted to fit the occuring transverse forces.

The starting material for a sandwich panel is a flexible central core in a honeycomb structure or some other light body, which substantially defines the thickness of the panel. A covering layer is deposited on both sides of this core which comprises a preimpregnated material saturated with resin (i.e. a supporting material, advantageously glass fiber sheet or mat soaked with resin). Both these covering layers provide the core with a high stiffness or rigidity as soon as the hardening takes place. The covering layers and the insert or core are subjected to pressure and/or heat at a certain temperature to harden the resin.

In the hardened state a preimpregnated material is still somewhat flexible over certain portions of its periphery. That is the same for a core or insert in a honeycomb structure with only one covering layer. As soon as both covering layers are applied, the finished sandwich panel is extremely stable but is of very light weight. The covering layers can be deposited in different thicknesses according to the requirements for rigidity or flexibility.

According to our invention the making of the components of an airplane passenger seat results in an extremely stable seat with a minimum weight and a simple construction. The base members of most of the components can be simply cut from plane parallel sandwich panels, advantageously packetwise as in clothing manufacture. Other components are made simply by hardening in a mold from covering layers and supporting cores.

We claim:

1. A passenger seat for an airplane, comprising:
    a seat shell adapted to receive a seat cushion;

a pedestal supporting said seat shell;

a pair of supporting pieces flanking said seat shell;

respective armrests pivotally connected to said supporting pieces; and a backrest connected to said seat shell and adapted to receive a backrest cushion, said seat shell, said pedestal, said supporting pieces, said armrests and said backrest each being constituted of at least two sandwich panels bonded together and each having a honeycomb core flanked by cover layers.

2. The passenger seat defined in claim 1 wherein the two sandwich panels for at least one of the seat shell, pedestal, armrests, supporting pieces and backrest are bonded to a third sandwich panel.

3. The passenger seat defined in claim 1 wherein said sandwich panels are assembled from honeycomb cores and cover layers of different thicknesses.

4. The passenger seat defined in claim 1, further comprising edge channels covering edges of the bonded together sandwich panels.

5. The passenger seat defined in claim 4 wherein at last one of the sandwich panels of the seat shell is formed with slits and bent to provide a seating surface.

6. A method of making a passenger seat for an airplane which comprises the steps of:

gluing at least two sandwich panels each comprising a honeycomb core bonded to a pair of cover layers and forming from the glued-together sandwich panels a pedestal, armrests, a backrest and a pair of support members of a passenger seat; and slitting at least one of the sandwich panels of a pair of glued-together sandwich panels and bonding same to a configuration of a seat shell mounted on said pedestal.

* * * * *